US006813432B2

(12) United States Patent
Salib

(10) Patent No.: US 6,813,432 B2
(45) Date of Patent: Nov. 2, 2004

(54) METHOD FOR PRODUCING VERTICAL TAPERS IN OPTICAL WAVEGUIDES BY OVER POLISHING

(75) Inventor: Michael S. Salib, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 10/160,625

(22) Filed: May 31, 2002

(65) Prior Publication Data

US 2003/0223719 A1 Dec. 4, 2003

(51) Int. Cl.⁷ .................................................. G02B 6/10
(52) U.S. Cl. ......................... 385/129; 385/43; 385/50; 372/45
(58) Field of Search ..................... 385/43, 50, 123, 385/129, 131; 372/45, 46, 50; 264/1.25

(56) References Cited

U.S. PATENT DOCUMENTS

| 4,911,516 | A | | 3/1990 | Palfrey et al. |
| 6,200,502 | B1 | * | 3/2001 | Paatzsch et al. ........... 264/1.25 |
| 6,380,092 | B1 | | 4/2002 | Annapragada et al. |
| 6,411,764 | B1 | * | 6/2002 | Lee ............................. 385/131 |

FOREIGN PATENT DOCUMENTS

| JP | 09297235 | 11/1997 |
| JP | 11284061 | 10/1999 |
| WO | WO 00/36442 | 6/2000 |
| WO | PCT/US 03/11833 | 10/2003 |

OTHER PUBLICATIONS

Brenner T. et al., "Vertically Tapered InGaAsP/InP Waveguides for Highly Efficient Coupling to Flat–end Single–mode Fibers", American Institute of Physics, Aug. 15, 1994, pp. 798–800, vol. 65, Woodbury, NY, US.

* cited by examiner

Primary Examiner—Phan T.H. Palmer
(74) Attorney, Agent, or Firm—Blakely, Sokoloff, Taylor & Zafman LLP

(57) ABSTRACT

A method to form a waveguide taper includes forming a core layer on a cladding layer. A protective layer with an opening is formed on the core layer, the opening exposing a portion of the core layer. A CMP process is performed so that dishing occurs in the exposed portion, forming a depression with a sloped sidewall. In one embodiment, the core layer is then patterned so that a portion of the core layer is removed to about the depth of the depression. This removed portion includes a part of the core layer containing the depression. The resulting structure includes an unetched sloped surface that transitions to a substantially planar etched surface. The core layer is patterned and etched again to form the waveguide, with the sloped surface forming part of the taper.

29 Claims, 3 Drawing Sheets

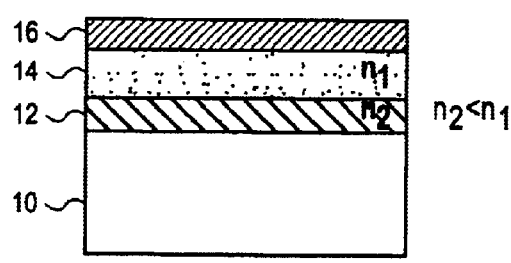 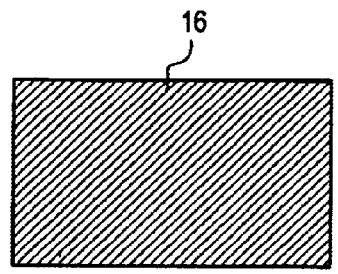
FIG. 1　　　　　　　FIG. 1A
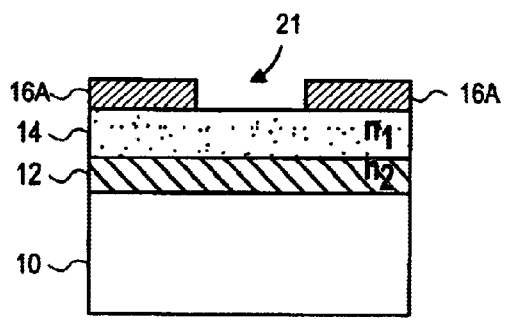 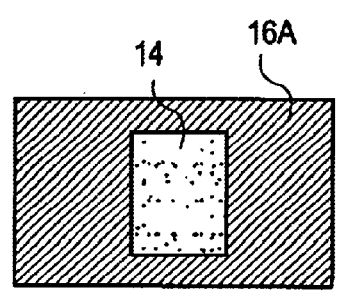
FIG. 2　　　　　　　FIG. 2A
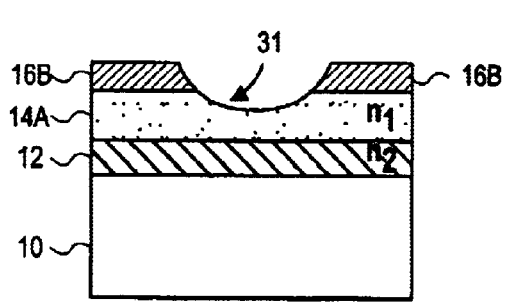 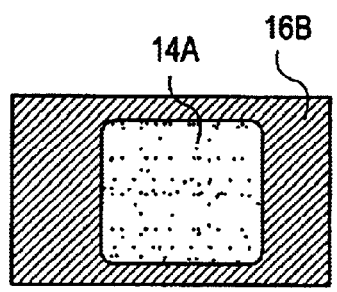
FIG. 3　　　　　　　FIG. 3A

## METHOD FOR PRODUCING VERTICAL TAPERS IN OPTICAL WAVEGUIDES BY OVER POLISHING

CROSS REFERENCE TO RELATED APPLICATIONS

The present invention is related to commonly-assigned and co-filed U.S. patent application Ser. No. 10/159,379 entitled "Fabrication Of A Waveguide Taper Through Ion Implantation" by M. Salib et al., and to U.S. patent application Ser. No. 10/159,238 entitled "Epitaxial Growth For Waveguide Tapering" by M. Morse.

FIELD OF THE INVENTION

The field of invention relates to optical communication devices in general; and, more specifically but not limited to waveguide tapers in optical devices.

BACKGROUND

Some optical devices may include a waveguide that is intended to be coupled to another waveguide having a significantly larger cross-sectional size. For example, a planar lightwave circuit (PLC) can have a waveguide on the order of four microns in height to be coupled to an optical fiber with a diameter of about ten microns. One way to couple a port of a relatively large waveguide to a port of a significantly smaller waveguide is by forming a tapered waveguide structure to couple the two waveguides. In one type of taper, the taper at one end has a height or diameter of about the same size as the larger waveguide. At the other end, the taper typically comes to a point. The sides of the taper are typically straight so that the taper has a wedge-like shape, with the wider part of the taper being at the end of the waveguide. This end of the taper is used to couple the taper to the larger waveguide. The interior end of the taper serves as a termination, which along with the narrowing shape of the taper helps force light to propagate from the wide end of the taper to the smaller waveguide (or from the smaller waveguide to the wide end of the taper).

One conventional technique to form the above-described taper when the smaller waveguide is a semiconductor waveguide is to form the smaller waveguide with an end portion from which the taper is formed by etching. That is, at this end portion, the smaller waveguide has: (a) a length about equal to the desired length of the taper; and (b) a thickness that is about equal to the sum of the desired thickness of the smaller waveguide and the desired thickness of the taper. This thickness is typically the size of the fiber core (e.g., 8–10 μm).

This end portion of the smaller waveguide is then etched using standard etching techniques to form the taper with a shape as described above. However, some etching processes cause the taper's edge end to appear eroded and rough, instead of achieving the desired smooth sharp edge. A rough eroded edge can degrade performance of the taper. In addition, typical etching processes cause the etched surfaces to be significantly less smooth than the surfaces that are not etched. This roughness can increase the waveguide's loss (e.g., in some tests the etched surfaces increased loss by about an additional five dB/cm.

BRIEF DESCRIPTION OF THE DRAWINGS

Non-limiting and non-exhaustive embodiments of the present invention are described with reference to the following figures, wherein like reference numerals refer to like parts or elements having the same or substantially similar functions and/or structures throughout the various views unless otherwise specified. Further, terms such as "upper", "vertical", "lateral", "beneath", etc. may be used herein in describing the figures. These terms are used in a relative sense; i.e., to show relative orientation of the parts or elements as depicted in the figures and not necessarily with respect to gravity or as physical embodiments that may be oriented during use.

FIGS. 1 and 1A are representative cross-sectional and top views of an initial stage in fabricating a vertical taper, according to one embodiment of the present invention.

FIGS. 2 and 2A are representative cross-sectional and top views of another stage in fabricating a vertical taper, respectively, according to one embodiment of the present invention.

FIGS. 3 and 3A are representative cross-sectional and top views of still another stage in fabricating a vertical taper, respectively, according to one embodiment of the present invention.

DETAILED DESCRIPTION

Figure 4:
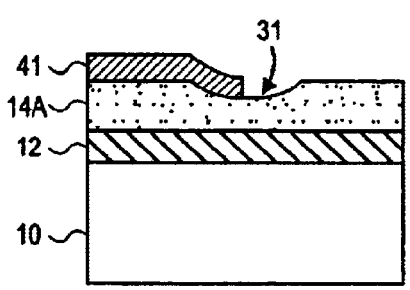
FIGS. 4 and 4A are representative cross-sectional and top views of yet another stage in fabricating a vertical taper, respectively, according to one embodiment of the present invention.

FIG. 1 illustrates a partial cross-section of a semiconductor workpiece (not to scale) during an early stage in fabricating a vertical taper, according to one embodiment of the present invention. The workpiece includes a semiconductor substrate 10, a cladding layer 12, a core layer 14, and a protective layer 16.

In some embodiments, core layer 14 is formed from a semiconductor material while cladding layer 12 is formed from an insulating material (e.g., oxide) in which the refractive index $n_1$ of core layer 14 is greater than the refractive index $n_2$ of cladding layer 12. In this embodiment, core layer 14 is formed from silicon and cladding layer 12 is formed from silica ($SiO_2$). Protective layer 16, in some embodiments, is formed from oxide. In other embodiments in which core layer 14 is formed from silica, protective layer 16 can be formed from a silicon nitride (e.g., $Si_3N_4$). In addition, cladding layer 14 could also be formed from nitride.

More particularly, cladding layer 12 is formed between semiconductor substrate 10 and core layer 14. In this embodiment, semiconductor substrate 10 is formed from silicon; however, semiconductor substrate 10 can be formed from different semiconductor materials in other embodiments (e.g., Gallium Arsenide). Further, in this embodiment, cladding layer 12 is formed from a silicon oxide (e.g., silica), although in other embodiments cladding layer 12 can be formed from other non-conductive materials.

In one embodiment, semiconductor substrate 10, cladding layer 12 and core layer 14 are formed using known silicon on insulator (SOI) wafer fabrication processes. For example, a buried oxide layer can be formed using known oxygen implantation processes to serve as cladding layer 12. Cladding layer 12, in this embodiment, has a thickness of about 1 μm, but can range from about 0.35 μm to 2 μm in other embodiments. Further, in this embodiment, core layer 14 is a silicon layer with a thickness of about 2.5 μm, but can have a thickness ranging from about 1 μm to 10 μm in other embodiments.

Protective layer 16, in one embodiment, is an oxide layer with a thickness of about 2 μm, but can range from about 0.5 μm to about 5 μm in other embodiments. The oxide of this embodiment of protective layer 16 can be formed using any suitable known process such as, for example, a low temperature oxide (LTO) process. Although an oxide protective layer is described, other materials can be used in other embodiments. For example, materials having a lower chemical mechanical polishing (CMP) removal rate for a selected CMP process (e.g., polishing pad and slurry) that the material of core layer 14 may be suitable for protective layer 16. FIG. 1A illustrates a top view of the resulting structure (not to scale), with protective layer 16 being the only layer that is visible.

FIG. 2 illustrates a partial cross-section of the semiconductor workpiece (not to scale) during another stage, according to one embodiment of the present invention. In this stage, protective layer 16 (FIG. 1) is patterned to have an opening 21, shown as patterned protective layer 16A in FIG. 2. In some embodiments, known photolithography techniques are used to form patterned protective layer 16A. Opening 21 defines a region in which the vertical taper will be formed. In this embodiment, opening 21 is rectangular in shape, although other shapes may be used in other embodiments. FIG. 2A illustrates a top view of the resulting structure (not to scale), with patterned protective layer 16A being visible. In addition, a portion of core layer 14 is exposed via opening 21 in patterned protective layer 16A.

FIG. 3 illustrates a partial cross-section of the semiconductor workpiece (not to scale) during another stage, according to one embodiment of the present invention. In this stage, a chemical mechanical polishing (CMP) process is performed on the structure of FIG. 2. Further, in this embodiment, the CMP process is performed so that "dishing" occurs, as described below.

As is well known in the art of CMP, "dishing" can occur when the surface being polished includes a trench or via filled with a material that is different from the material surrounding the trench or via. Dishing typically occurs during a CMP operation when the material within the trench or via can be removed at a faster rate than the material surrounding the trench or via. This may occur when the surface is "over polished". Dishing causes the material in the trench or via to have a concave surface topology. In the context of this embodiment, a CMP operation is performed on the structure of FIG. 2 using a recipe that causes dishing. As a result, the CMP operation forms a depression 31 in the portion of the core layer that is exposed by opening 21 (FIG. 2). The core layer with depression 31 is indicated in FIG. 3 as polished core layer 14A.

In one embodiment, the CMP "recipe" is designed to increase the normally undesirable "dishing" of the exposed portion of core layer 14. For example, in an embodiment in which the core layer is formed from silicon, a silicon-selective slurry can be used (i.e., a slurry that achieves a higher removal rate for silicon relative to its removal rate for the material of patterned protective layer 16A). The hardness of the polishing pad, polishing pressure, rotation rate, polishing time and/or other CMP parameters can be optimized to achieve the desired concave shape for depression 31. For example, in one embodiment the CMP recipe is designed so that the dishing causes an upper portion of the sidewall of depression 31 to have a sloped topography that is desired for the vertical taper.

In some embodiments, some material is removed during the CMP operation from the upper portion of patterned protective layer 16A (FIG. 2) and from the sidewalls of opening 21 (FIG. 2). The resulting structure of the protective layer is indicated as polished protective layer 16B in FIG. 3. In other embodiments, the amount of material removed from the protective layer during CMP is not significant when compared to the material removed from core layer 14.

FIG. 3A illustrates a top view of the resulting structure (not to scale) showing polished protective layer 16B. In addition, depression 31 of patterned core layer 14A is visible through opening 21 (which in this embodiment is widened or eroded by the CMP operation).

FIG. 4 illustrates a partial cross-section of the semiconductor workpiece (not to scale) during another stage, according to one embodiment of the present invention. In this stage, polished protective layer 16B (FIG. 3) is removed. In one embodiment, a selective etching process is used to remove polished protective layer 16B while leaving polished core layer 14A essentially the same as it was before the etching process was performed.

In an alternative embodiment, patterned protective layer 16A (FIG. 2) is removed during the CMP operation. For example, the protective layer can be relatively thin. In addition, the CMP recipe can be designed to remove the protective layer at a rate that results in the protective layer being cleared when depression 31 in the core layer has reached the desired shape.

An etching mask 41 is then formed on polished core layer 14A as shown in FIG. 4. For example, etching mask 41 may be formed from $Si_3N_4$ and then patterned using known photolithography techniques to mask a portion of polished core layer 14A (including a portion of depression 31). Etching mask 41 defines a taper to be formed at an end of a waveguide. More specifically, etching mask 41 covers the portion of depression 31 that has the sloped topography that is desired for the vertical taper.

Figure 4A:
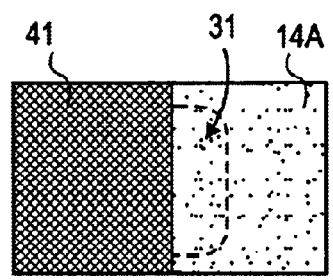

FIG. 4A illustrates a top view of the resulting structure (not to scale). As shown, etching mask 41 is visible, along with a portion of polished core layer 14A of core layer 14. A portion of depression 31 is indicated in dashed lines in FIG. 4A.

Figure 5:
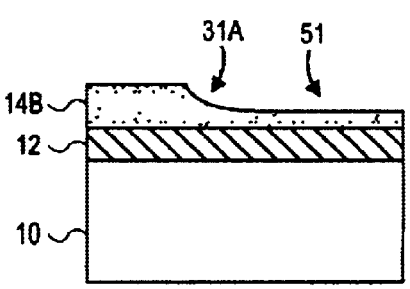
FIGS. 5 and 5A are representative cross-sectional and top views of still yet another stage in fabricating a vertical taper, respectively, according to one embodiment of the present invention.

FIG. 5 illustrates a partial cross-section of the semiconductor workpiece (not to scale) during still another stage, according to one embodiment of the present invention. In this stage, polished core layer 14A (FIG. 4) is etched and etching mask 41 (FIG. 4) is removed. In one embodiment, an etchback process is used to etch the portion of polished core layer 14A (FIG. 4) left uncovered by etching mask 41 (FIG. 4). For example, in one embodiment, a photoresist is spun onto the structure of FIG. 4. An etching process is then performed that etches the material of the photoresist and core layer at substantially the same rate, while being nonselective for the material of etching mask 41.

Figure 5A:
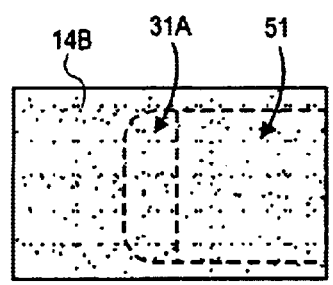

The etching process is performed to remove an "excess" portion polished core layer 14A (FIG. 4) to form a waveguide with a vertical taper at an end of the waveguide. In this embodiment, the portion of polished core layer 14A (FIG. 4) left uncovered by etching mask 41 (FIG. 4) is etched until it is planarized, which is indicated in FIG. 5 as portion 51 of etched core layer 14B. Further, in this embodiment the upper surface of portion 51 of etched core layer 14B is level with the portion of the surface of depression 31 (FIG. 4) that is aligned with the sidewall of etching mask layer 41 (FIG. 4). Consequently, this etching process changes depression 31 (FIG. 4) into a sloped region 31A as indicated in FIG. 5. The resulting thickness of the planarized portion of etched core layer 14B is the desired thickness of the waveguide being formed. Etching mask 41 is then removed. The resulting structure is shown in FIGS. 5 and 5A.

This stage of the vertical taper fabrication process represents a significant improvement over conventional processes that etch silicon to form the vertical taper. For example, as previously described, etching the core layer to form the sloped surface can undesirably roughen the sloped surface, increasing loss. In contrast, in accordance with embodiments of the present invention, the sloped surface of the vertical taper is not etched. Rather, the sloped surface is polished using a CMP process, which can result in a smoother sloped surface. Consequently, the vertical taper formed by CMP of the core layer could generally have less loss than one that is formed by etching.

In subsequent processing steps, etched core layer 14B (including sloped region 31A) can be patterned and etched to form a waveguide. In addition, this patterning and etching process can form a lateral taper (not shown) in the core layer 14. A lateral taper can make coupling the waveguide to another waveguide or optical fiber that has a larger cross sectional area than the waveguide formed in core layer 14. Although not shown, another cladding layer (e.g. oxide, nitride, etc.) can be formed over the structure shown in FIGS. 5 and 5A in subsequent processing steps.

Figure 6:
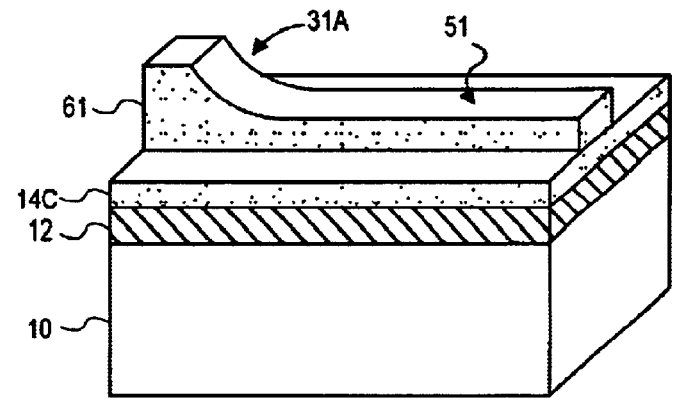
FIG. 6 is a representative isometric perspective view of the section shown in FIG. 5, according to an embodiment of the present invention.

FIG. 6 illustrates a perspective view of a section shown in FIG. 5 after etched core layer 14B (FIG. 5) has been patterned and etched to form part of a waveguide of a PLC. The core layer is shown as patterned core layer 14C in FIG. 5. In this embodiment, the waveguide is a rib waveguide.

In operation, for example, an optical fiber can be coupled to the wide end 61 of the taper structure so that an optical signal can propagate from the optical fiber into portion 51 of patterned core layer 14C of the waveguide. Sloped region 31A causes the optical signal to propagate downwards as the optical signal propagates toward portion 51 of patterned core layer 14C.

Further, although embodiments for vertical taper applications are described above, other embodiments may be used in other mode converter applications as well.

Figure 7:
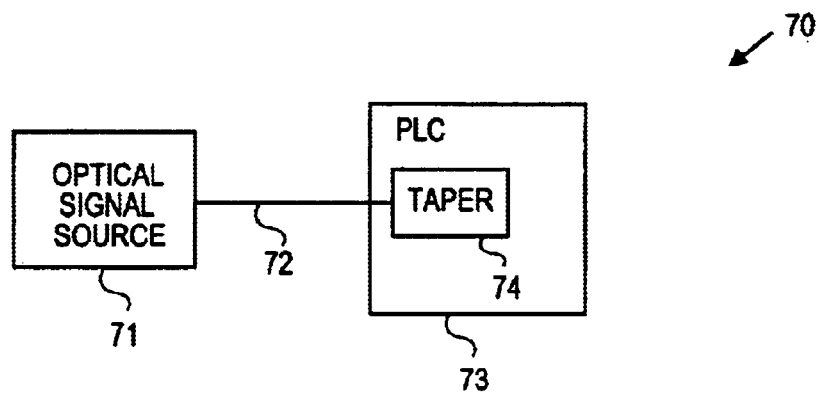
FIG. 7 is a block illustrating an exemplary system using a taper fabricating according to embodiments of the present invention.

FIG. 7 illustrates a system 70 in which a waveguide taper according to embodiments of the present invention can be used. System 70 includes an optical signal source 71 connected to one end of an optical fiber 72. The other end of optical fiber 72 is connected to a PLC 73 that includes a taper 74. Taper 74 is fabricated according to one of the embodiments described above. For example, when the taper is implemented as shown in the embodiment of FIG. 6, wide end 61 would be used to connect PLC 73 to the end of optical fiber 72. In one embodiment, PLC 73 is implemented in an integrated circuit. Other embodiments may have one or more other tapers (not shown) that are essentially identical in structure to taper 74.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the forgoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An integrated circuit comprising:
   a semiconductor substrate;
   a first cladding layer disposed on the semiconductor substrate;
   a core layer disposed on a surface of the first cladding layer, the core layer having a first surface, a second surface and a third surface, wherein the first surface is a polished surface and sloped relative to the second surface, the second surface is substantially parallel to the surface of the first cladding layer, and the third surface to connect to a waveguide that is external to the PLC; and
   a second cladding layer disposed on the core layer.

2. The integrated circuit of claim 1 wherein the external waveguide is an optical fiber.

3. The integrated circuit of claim 1 wherein the first surface was polished by chemical mechanical polishing (CMP).

4. The integrated circuit of claim 1 wherein the core layer comprises a semiconductor material.

5. The integrated circuit of claim 1 wherein the core layer comprises silica.

6. The integrated circuit of claim 1 wherein the cladding and core layers are silicon and insulator layers of a silicon on insulator (SOI) wafer.

7. A system comprising:
an optical signal source;
an optical fiber having one end coupled to the optical signal source; and
an integrated circuit that includes:
a semiconductor substrate;
a first cladding layer disposed on the semiconductor substrate;
a core layer disposed on a surface of the first cladding layer, the core layer having a first surface, a second surface and a third surface, wherein the first surface is a polished surface and sloped relative to the second surface, the second surface is substantially parallel to the surface of the first cladding layer, and the third surface to connect to another end of the optical fiber; and
a second cladding layer disposed on the core layer.

8. The system of claim 7 wherein the external waveguide is an optical fiber.

9. The system of claim 7 wherein the first surface was polished by chemical mechanical polishing (CMP).

10. The system of claim 7 wherein the core layer comprises a semiconductor material.

11. The system of claim 7 wherein the core layer comprises silica.

12. The system of claim 7 wherein the cladding and core layers are silicon and insulator layers of a silicon on insulator (SOI) wafer.

13. A method for fabricating a taper, comprising:
forming a cladding layer over a substrate;
forming a core layer on the cladding layer;
forming a protective layer on the core layer, the protective layer having an opening; and
polishing the protective layer and the exposed region of the core layer using a chemical mechanical polishing (CMP) process to create a depression in the core layer aligned with the opening of the protective layer, a first portion of the core layer having a first surface defining a first part of the depression, the first surface of the first portion to serve as a sloped surface of the taper.

14. The method of claim 13 further comprising:
removing the protective layer; and
removing a second portion of the core layer that contacts to the first portion so that a third portion of the core layer has a substantially planar surface that is adjacent to the first region.

15. The method of claim 14 further comprising removing a fourth portion of the core layer to form a waveguide core.

16. The method of claim 15 further comprising forming a second cladding layer on the core layer.

17. The method of claim 14 wherein the first surface of the first region is aligned with the substantially planar surface of the third region.

18. The method of claim 14 wherein the second portion of the core layer is removed by etching.

19. The method of claim 14 wherein the protective layer is removed during the CMP process.

20. The method of claim 13 wherein the cladding and core layers are formed using a silicon on insulator (SOI) wafer.

21. The method of claim 13 wherein the core layer is formed from a semiconductor material.

22. The method of claim 13 wherein the core layer is formed from silica.

23. An apparatus for propagating an optical signal, the apparatus comprising:
a cladding layer; and
a core layer disposed on a surface of the cladding layer, the core layer having a first surface and a second surface, wherein the first surface is a polished surface that is sloped relative to the second surface, and wherein the second surface is substantially parallel to the surface of the cladding layer.

24. The apparatus of claim 23 wherein the cladding and core layers are silicon and insulator layers of a silicon on insulator (SOI) wafer.

25. The apparatus of claim 23 wherein the first surface was polished by chemical mechanical polishing (CMP).

26. The apparatus of claim 23 further comprising a second cladding layer disposed on the core layer.

27. The apparatus of claim 23 wherein the core layer is formed from a semiconductor material.

28. The apparatus of claim 23 wherein the core layer is formed from silica.

29. The apparatus of claim 23 wherein the core layer has a third surface to couple to an optical fiber.

* * * * *